US007792123B2

(12) United States Patent
Hu (10) Patent No.: US 7,792,123 B2
(45) Date of Patent: Sep. 7, 2010

(54) METHOD AND SYSTEM FOR IMPLEMENTING HIERARCHICAL VPLS

(75) Inventor: Chunzhe Hu, Shenzhen (CN)

(73) Assignee: Huawei Technology Co., Ltd., Shenzhen (CN)

(*) Notice: Subject to any disclaimer, the term of this patent is extended or adjusted under 35 U.S.C. 154(b) by 198 days.

(21) Appl. No.: 11/968,280

(22) Filed: Jan. 2, 2008

(65) Prior Publication Data
US 2008/0101390 A1    May 1, 2008

Related U.S. Application Data

(63) Continuation of application No. PCT/CN2006/001413, filed on Jun. 21, 2006.

(30) Foreign Application Priority Data
Aug. 9, 2005    (CN) .................. 2005 1 0089862

(51) Int. Cl.
*H04L 12/28* (2006.01)
*H04L 12/56* (2006.01)
(52) U.S. Cl. .................. 370/395.53; 370/401
(58) Field of Classification Search .............. None
See application file for complete search history.

(56) References Cited

U.S. PATENT DOCUMENTS

| 2004/0037275 | A1* | 2/2004 | Li et al. ............... 370/370 |
| 2004/0037279 | A1* | 2/2004 | Zelig et al. ............ 370/390 |
| 2004/0133619 | A1* | 7/2004 | Zelig et al. ............ 709/200 |
| 2004/0196827 | A1  | 10/2004 | Xu et al. |
| 2005/0198301 | A1* | 9/2005 | Ould-Brahim ........... 709/227 |
| 2006/0013142 | A1* | 1/2006 | Hongal et al. ........... 370/248 |

FOREIGN PATENT DOCUMENTS

| CN | 1414749 | 4/2003 |
| CN | 1414749 A | 4/2003 |
| CN | 1649320 | 8/2005 |
| CN | 100563190 C | 11/2009 |
| WO | WO2005/064858 | 7/2005 |

OTHER PUBLICATIONS

K. Kompella, Y. Rekhter, "Virtual Private LAN Service", IETF Network Working Group, <draft-ietf-l2vpn-vpls-bgp-05>, Apr. 2005, entire document.*
M. Lasserre, V. Kompella, "Virtual Private LAN Services over MPLS", IETF L2VPN Working Group, <draft-ietf-l2vpn-vpls-ldp-07>, Jul. 2005, p. 13-20.*
S. Khandekar, V. Kompella, J. Regan, N. Tingle, P. Menezes, M. Lassere, K. Kompella, M. Borden, T. Soon, G. Heron, R. Haberman, R. Wilder, "Hierarchical Virtual Private LAN Service", IETF Provider Provisioned VPN Working Group, <draft-khandekar-ppvpn-hvpls-mpls-00>, Jun. 2002, entire document.*

(Continued)

*Primary Examiner*—Gregory B Sefcheck
*Assistant Examiner*—Suk Jin Kang
(74) *Attorney, Agent, or Firm*—Finnegan, Henderson, Farabow, Garrett & Dunner LLP (57) ABSTRACT

A method for implementing hierarchical Virtual Private LAN Service (VPLS), includes: using Border Gateway Protocol (BGP) in a VPLS network; and implementing hierarchical VPLS in the VPLS network by using the BGP. The invention further provides a system for implementing hierarchical VPLS.

16 Claims, 7 Drawing Sheets

OTHER PUBLICATIONS

T. Bates, R. Chandra, E. Chen, "BGP Route Reflection—An Alternative to Full Mesh IBGP", IETF Network Working Group, RFC 2796, Apr. 2000, entire document.*

M. Lasserre, V. Kompella, "Virtual Private LAN Services over MPLS", IETF L2VPN Working Group, <draft-ietf-l2vpn-vpls-ldp-05>, Sep. 2004, p. 12-20.*

English Translation of the PCT Written of the International Searching Authority for International Application No. PCT/CN2006/001413, mailed Oct. 26, 2006, 4 pgs.

First Office Action of the State Intellectual Property Office of the PRC for Application No. 200680012301.X, dated Oct. 9, 2009, 6 pgs. English translation attached.

First Office Action of the State Intellectual Property Office of the PRC for Application No. 200510089862.7, dated Oct. 31, 2008, 4 pgs, English translation attached.

Bai, Wen-xiu et al., "A Solution of MPLS—Based VPN VIA BGP", College of Computer, Jilin Normal University, Siping 136000, China, 1994-2008 China Academic Journal Electronic Publishing House, 3pgs.

* cited by examiner

METHOD AND SYSTEM FOR IMPLEMENTING HIERARCHICAL VPLS

The present application is a continuation of PCT application PCT/CN2006/001413, filed on Jun. 21, 2006, entitled "METHOD AND SYSTEM FOR CARRYING OUT HIERARCHICAL VIRTUAL PRIVATE SWITCH SERVICES", which is incorporated by reference herein in its entirety.

The PCT application claims the priority of CN Application No. 200510089862.7 filed on Aug. 9, 2005, titled "METHOD FOR IMPLEMENTING HIERARCHICAL VPLS", which is incorporated herein by reference in its entirety.

FIELD OF THE INVENTION

The present invention relates to the field of communications, in particular, to a method and system for implementing hierarchical Virtual Private LAN Service (VPLS).

BACKGROUND OF THE INVENTION

As IP networks become the dominant networks of carriers, the demand on IP network-based services becomes more urgent. At present, Multiprotocol Label Switching, L2 Virtual Private Network (MPLS L2VPN) technology can provide IP service and Layer 2 VPN service simultaneously on the same network, and has features of being able to set any rate conveniently as well as simple configuration. Using this technology, carriers may provide various services such as IP service, Layer 3 VPN, Layer 2 VPN, Traffic Engineering and Differentiated Service (Diffserv) on the same network. As a result, for carriers the cost of construction, maintenance and operation can be reduced drastically.

MPLS L2VPN includes Virtual Private LAN Service (VPLS) and Virtual Leased Line (VLL).

VPLS is a kind of Layer 2 VPN, and the existing VPLS mainly has two drafts: draft-ietf-l2vpn-vpls-bgp-XX and draft-ietf-l2vpn-vpls-ldp-XX. Wherein, draft-ietf-l2vpn-vpls-ldp-XX defines a hierarchical VPLS, i.e. HVPLS in Virtual Private LAN Service Label Distribution Protocol (VPLS LDP) mode, while draft-ietf-l2vpn-vpls-bgp-XX does not designate the solution to realize a hierarchical model in Border Gateway Protocol (BGP) mode.

In HVPLS of VPLS LDP mode, VPLS networks can be connected with each other, so that VPLS service of a larger scale is established. Fully connected VPLS networks are connected with each other via a single Label Switch Path (LSP) tunnel, and in each VPLS network, two domains are connected via one or more (which is a backup scheme) Pseudo Wires (PWs). This solution requires that the whole VPLS network should belong to the same autonomous system.

The characteristic of HVPLS solution in VPLS LDP mode lies in that a Fully connected tunnel LSP is established among all Provider Edge routers (PEs) that provide VPLS service. For each VPLS service, n*(n−1)/2 PWs should be established among n PEs. These PWs may be generated via a signaling protocol. In this scheme, PEs providing Virtual Circuits (VCs) need to duplicate data packets; and for first packet, broadcast packet and multicast packet, each PE equipment needs to broadcast the packet to all of the connected equipment. Although the total number of broadcast packets duplicated remains the same, the broadcast packets are accomplished by a plurality of equipment in the HVPLS, thus the burden of signaling protocol and data packet duplication can be reduced via hierarchical connection.

In HVPLS of VPLS LDP mode, an ISP (Internet Service Provider) will usually place some small PEs to the customer agglomerations and converge these small PEs to a PE in the central office. Therefore, it is a requirement to extend the tunneling technology in VPLS service to Multi Tenant Units (MTUs), thus the MTUs may be regarded as PE equipment, and a basic VPLS pseudo connection service is provided on the edge of each MTU. Feasible technologies include employing pseudo connection and Q-in-Q (directly using tunneling protocols encapsulated by an Ethernet switch on the basis of 802.1 q) logic interface between an MTU and a PE. In a hierarchical VPLS with two hierarchies, one hierarchy is the core PW of the VPLS, and the other is an extended access PW.

There are two access modes between the two hierarchies of HVPLS, wherein one access mode is MPLS Edge HVPLS (ME-HVPLS), the other is Ethernet Edge HVPLS (EE-HVPLS).

Figure 1:
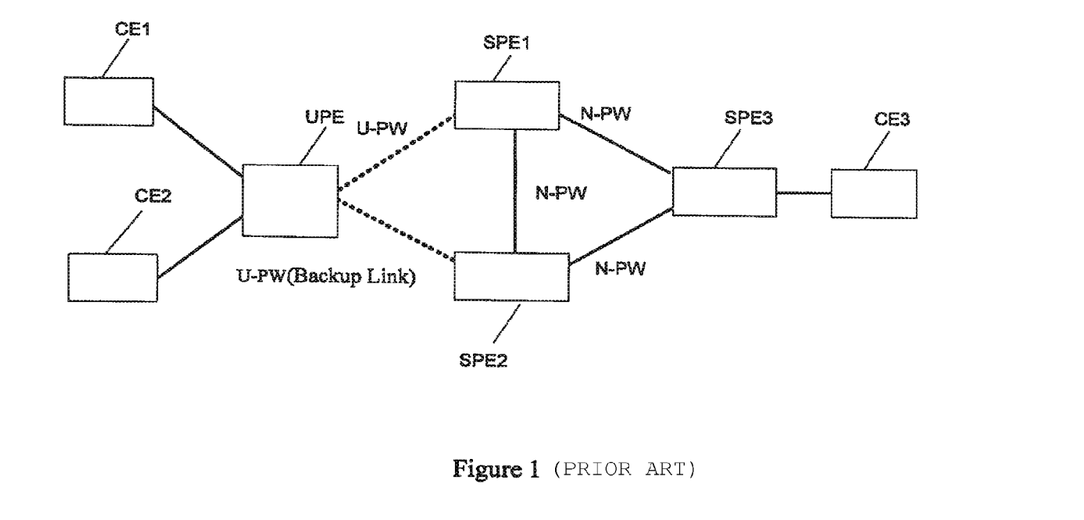
FIG. 1 is a schematic diagram showing the networking of ME-HVPLS access mode in the prior art.

The networking structure of ME-HVPLS mode is shown in FIG. 1:

CE1, CE2 and CE3 are Customer Edge routers, SPE1, SPE2 and SPE3 are Service Provider-end Provider Edge routers, and UPE means User-end Provider Edge router, which, as a converge device, only establishes a pseudo connection access link U-PW with SPE1 and establishes a U-PW backup link with SPE2. In other words, it will not establish any pseudo links with any other opposite end. In such a networking mode, the data forwarding process is as follows: a UPE forwards a packet sent from CE1 to SPE1 after placing an MPLS label corresponding to U-PW on the packet, and at the same time, SPE1 determines the Virtual Switch Instance (VSI) to which the packet belongs according to the multiplexing separation label, and then forwards the packet after placing a multiplexing separation label corresponding to N-PW on the packet according to the destination Medium Access Control (MAC) address of the user packet. After SPE1 receives a packet sent from the N-PW side, it sends the packet to the UPE after placing a multiplexing separation label corresponding to U-PW on the packet. Then, the UPE forwards the packet to CE1.

If CE1 and CE2 are local CEs, when data exchange is needed between CE1 and CE2, because the UPE has a bridge function inherently, it performs packet forwarding between CE1 and CE2 directly, rather than delivering the packet upward to SPE1. However, for a first packet or a broadcast packet of which the destination MAC address is unknown, the UPE will still forward the packet to SPE1 via the U-PW at the same time when it forwards the packet directly between CE1 and CE2 via bridging broadcast, and SPE1 duplicates the packet and forwards it to each opposite CE.

Because the PW connected between a UPE and an SPE requires an LSP tunnel established on the basis of LDP and Interior Gateway Protocol (IGP) jointly, if the whole VPLS network does not belong to an autonomous system, because IGP cannot be operated, the tunnel cannot be established via IGP and LDP jointly and a PW cannot be established between two hierarchies of an HVPLS. In other words, the solution is not applicable for the case in which the whole VPLS network does not belong to an autonomous system.

SUMMARY OF THE INVENTION

According to one aspect of the invention, a method for implementing hierarchical Virtual Private LAN Service (VPLS) is provided to realize hierarchy in VPLS networks based on BGP across different autonomous systems. At the same time, hierarchy can also be realized in VPLS networks based on BGP in the same autonomous system, so that mutual access can be implemented between BGP VPLS and LDP VPLS.

According to another aspect of the invention, a system for implementing hierarchical VPLS is provided to realize hierarchical VPLS in a VPLS network based on BGP.

The following technical proposal is provided by the embodiments of the invention:

A method for implementing hierarchical VPLS, includes:
using Border Gateway Protocol (BGP) in a VPLS network; and
implementing hierarchical VPLS in the VPLS network by using the BGP.

A system for implementing hierarchical VPLS, comprising at least one UPE and at least one SPE, and the UPE and the SPE are connected via BGP.

It can be seen from the technical solution provided by the invention that in the invention, with BGP signaling, hierarchical VPLS networks based on BGP across different autonomous systems or in same autonomous system are realized.

DETAILED DESCRIPTION OF THE EMBODIMENTS

The core concept of the invention lies in that: Border Gateway Protocol (BGP) is used in a Virtual Private LAN Service (VPLS) network, and hierarchical VPLS based on BGP across different autonomous systems or in the same autonomous system is realized via BGP signaling or by setting Virtual Equipment Identifier (VEID) in a VPLS member management module.

Figure 2:
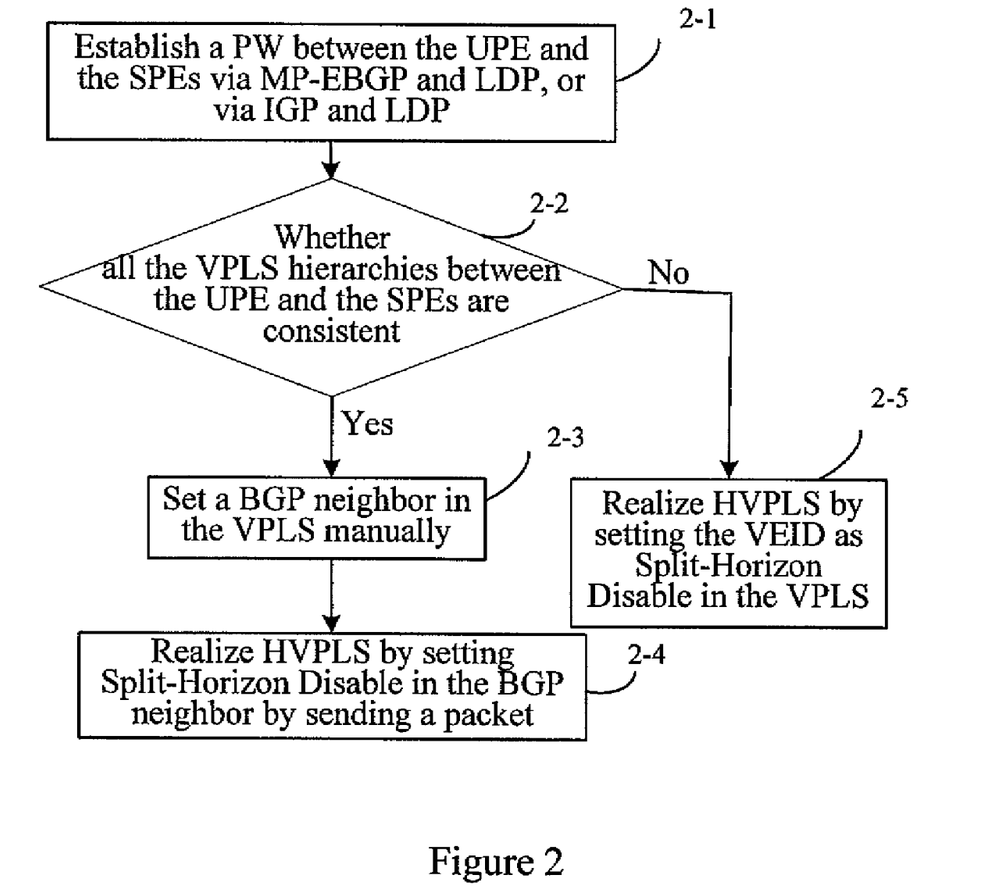
FIG. 2 is a flow chart of one embodiment of the method according to the invention.

The invention is described in detail in conjunction with the drawings, wherein FIG. 2 shows the process of one embodiment of the method according to the invention, which includes:

Step 2-1: Establish PWs between UPE (User-end Provider Edge router) and SPE (Service Provider-end Provider Edge) via Multi-Protocol External Border Gateway Protocol (MP-EBGP) and LDP, or via IGP and LDP.

Figure 3:
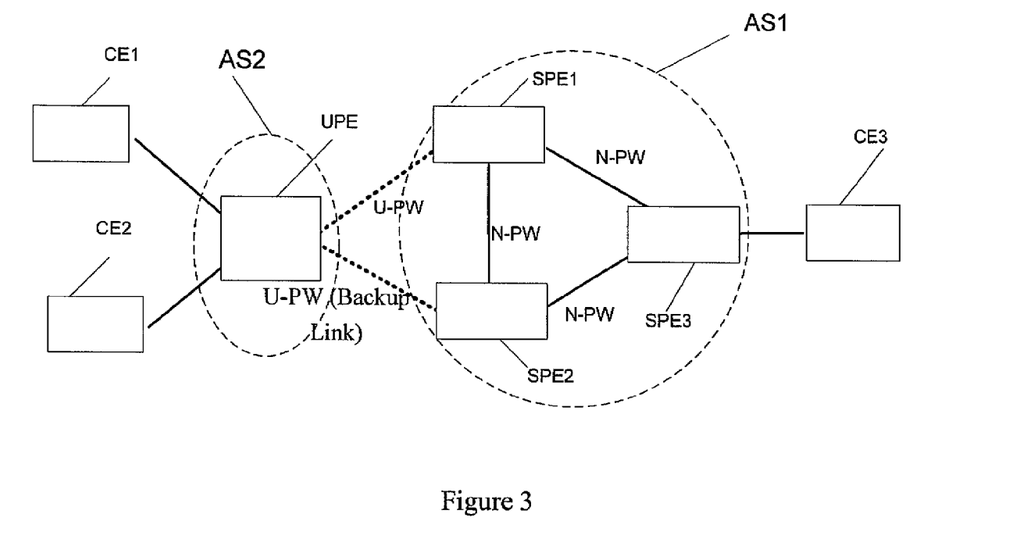
FIG. 3 is a schematic diagram showing the case in which UPE and SPE belong to different autonomous systems.

When the UPE and the SPE belong to different autonomous systems, as shown in FIG. 3, SPE1, SPE2 and SPE3 lie in autonomous system AS1, and the UPE lies in autonomous system AS2. BGP connection is employed between the SPE and the UPE, and among the SPEs.

It is well known to those skilled in the art that cross-domain PW needs a VC label and a tunnel, wherein the VC label may be delivered via Targeted LDP, but the tunnel needs LDP and IGP. However, only BGP can be operated between two autonomous systems. Therefore, if the SPE and the UPE belong to different autonomous systems, LDP and IGP cannot be used to establish PW between them.

In the invention, the MP-EBGP model in cross-domain mode 2 described in RFC2547 is employed to establish the PW between the UPE and the SPE, i.e. BGP is used to carry VPLS member information and to query the tunnel, and BGP is used to deliver information across domains.

Figure 4:
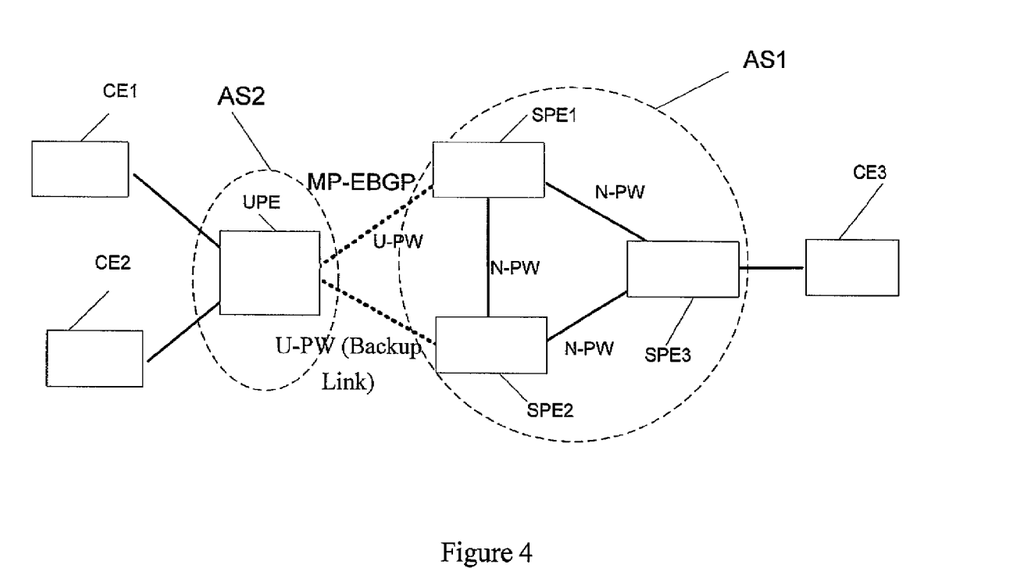
FIG. 4 is a schematic diagram showing the PWs between UPE and SPE established via MP-EBGP according to the invention.

As shown in FIG. 4, VPLS1 VE ID=1 and VPLS2 VE ID=1 are configured on the UPE. As specified in protocol draft-ietf-l2vpn-vpls-bgp-XX, VPLS1 and VPLS2 will have its Import Route Target (IRT) and Export Route Target (ERT) respectively. The IRT and ERT form the VPLS topology of the whole network, and make the VPLS isolate from each other. The VPLS on the UPE informs the topology information to BGP, and BGP delivers the information to SPE1 and SPE2, and then the information is delivered to a VPLS module on the SPE. The VPLS module on the SPE queries related VPLS configuration and tunnel resources, if they are both satisfied, then U-PW will be formed according to the PW label and the tunnel received. Likewise, the process to establish a PW from SPE1 to the UPE is similar. When the UPE and the SPE belong to the same autonomous system and BGP is operated between the SPEs, extension will be performed in BGP VPLS on the SPE, and the BGP VPLS member management module is configured to be able to access LDP VPLS, so that LDP and IGP can be operated between the UPE and the SPE according to the configuration.

Figure 5:
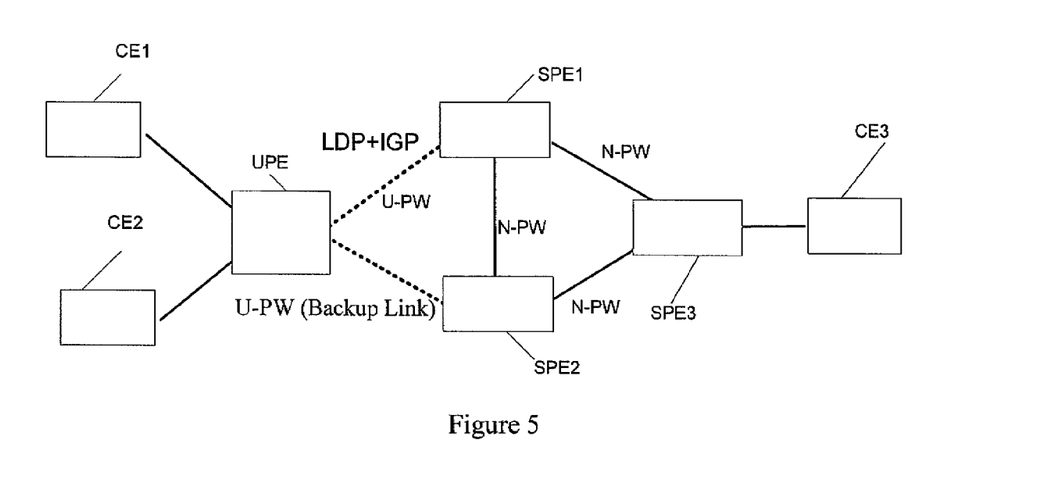
FIG. 5 is a schematic diagram showing the networking when the UPE and the SPE belong to the same autonomous system, wherein LDP and IGP are operated between the UPE and the SPE, and BGP is operated among the SPEs.

Referring to FIG. 5, it is a schematic diagram showing the networking when the UPE and the SPE belong to the same autonomous system, wherein LDP and IGP are operated between the UPE and the SPE, and BGP is operated among the SPEs.

A VPLS based on LDP PW mode is configured on the UPE, and SPE1 is also configured to access LDP PW in BGP mode. The VPLS information on the UPE is delivered to SPE1 via LDP, the LDP of SPE1 delivers the VPLS information received to the VPLS management module, and then a PW is formed according to the PW label and the tunnel received. Likewise, the process to establish a PW from SPE1 to the UPE is similar.

The advantage of such networking lies in that BGP of full connection mode can be used for core network, and network scalability can be improved by using RRs (router reflectors), and at the same time, LDP can be operated on the routers of an edge or access layer, thus the requirements on the performance of an edge equipment can be lowered, and the cost of network disposition can be reduced.

At this point, PW between the UPE and the SPE can be established via LDP signaling and tunnel, and the tunnel can be established via IGP and LDP jointly.

Step 2-2: check whether all the VPLS hierarchies between the UPE and the SPE are consistent.

For a certain VPLS, it is to be determined whether its UPE and SPE has a supervisor-subordinate relationship, because the UPE and the SPE may not be located at the same network position.

At least one VPLS network site may be configured on one UPE and SPE; for example, two VPLS network sites, VPLS1 and VPLS2, may be configured on the UPE and the SPE respectively.

Therefore, after PW between the UPE and the SPE is established, it is required to check whether all the VPLS network hierarchies between the UPE and the SPE are consistent. If they are consistent, then turn to Step 2-5; otherwise, turn to Step 2-3.

Step 2-3: Set BGP neighbor in the VPLS manually.

When the hierarchies of all the VPLS network sites between the UPE and the SPE are consistent, a BGP neighbor needs to be set in the VPLS network manually, i.e. the locations of the UPE and the SPE need to be determined in the VPLS network, and a BGP neighbor is required to be configured on each UPE and SPE.

Step 2-4: Implement HVPLS via setting Split-Horizon Disable in the BGP neighbor by sending a packet.

After BGP neighbor is set in the VPLS network, the VPLS network hierarchies will be configured.

First of all, a UPE and an SPE are designated in the BGP neighbor. Then, the UPE sends a signaling packet indicating the hierarchy information to the SPE. After SPE receives the packet, it sets a Split-Horizon Disable Flag directed to the UPE in the BGP neighbor in its VPLS address family, wherein the flag sets a supervisor-subordinate relationship between the UPE and the SPE compulsively, i.e. a supervisor-subordinate relationship will be set in all the VPLS networks configured on the UPE and the SPE. Subsequently, the SPE delivers the flag information to a VSI management module, and the VSI management module refreshes the flag information downward to a forwarding entry of the SPE. Because the SPEs belong to the same hierarchy, no Split-Horizon Disable Flags need to be set.

After the forwarding entry of the SPE receives the above flag information, it may process the packet as follows according to the hierarchy relationship indicated by the flag information while forwarding the packet:

1) For a unicast packet from the SPE, if it is found that the output interface of the MAC table is a PW to the UPE, then the unicast packet is forwarded to the UPE. For a broadcast packet from the SPE, it will be forwarded directly to the UPE. At the same time, the SPE will not forward the unicast packet and the broadcast packet to other SPEs.

2) For a broadcast packet from the UPE, the SPE forwards it to other SPEs after duplicating it, and other SPEs will forward the packet to other UPEs.

Figure 6:
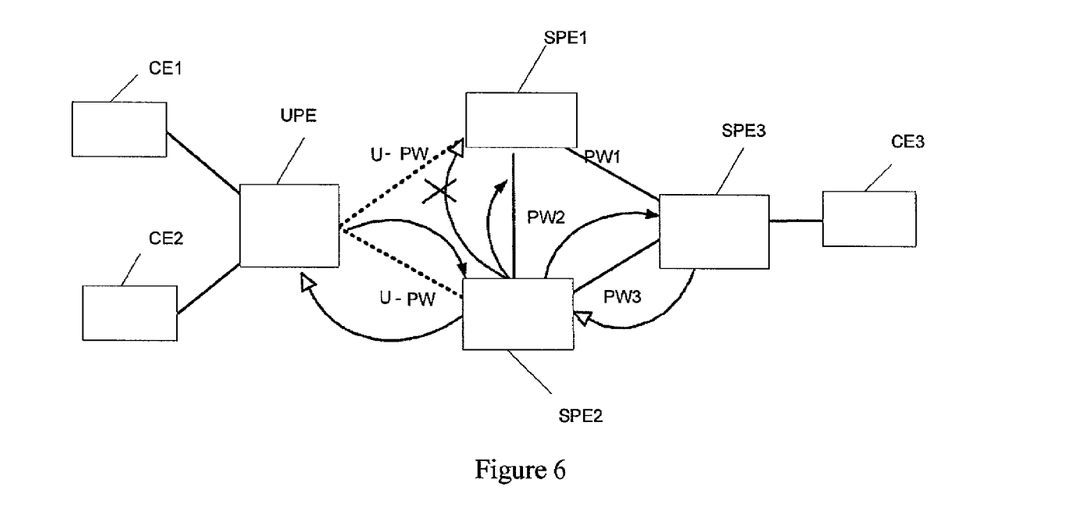
FIG. 6 is a schematic diagram showing the process in which the SPEs forward a packet in the HVPLS of the invention.

The above process in which the SPE forward a packet is shown in FIG. 6 schematically.

It is a mutual process to set hierarchies on BGP neighbors of the VPLS network; i.e. the SPE also sends a packet indicating the hierarchy information to the UPE, and the UPE sets a Split-Horizon Disable Flag directed to the SPE on its BGP neighbor after receiving the packet, and forwards the packet sent from the SPE to a CE router.

After the above configuration, hierarchy is realized between the SPE and the UPE in a VPLS network; in other words, the SPE in a core network is configured as the first hierarchy, and the UPE in an edge network is configured as the second hierarchy. Additionally, the forwarding of all the VPLS members delivered from the BGP neighbor will be controlled by setting a Split-Horizon Disable Flag. Therefore, the hierarchies of BGP VPLS network can be realized; in other words, HVPLS based on BGP can be realized.

Step 2-5: Implement HVPLS by setting the VEID as Split-Horizon Disable in VPLS.

Figure 7:
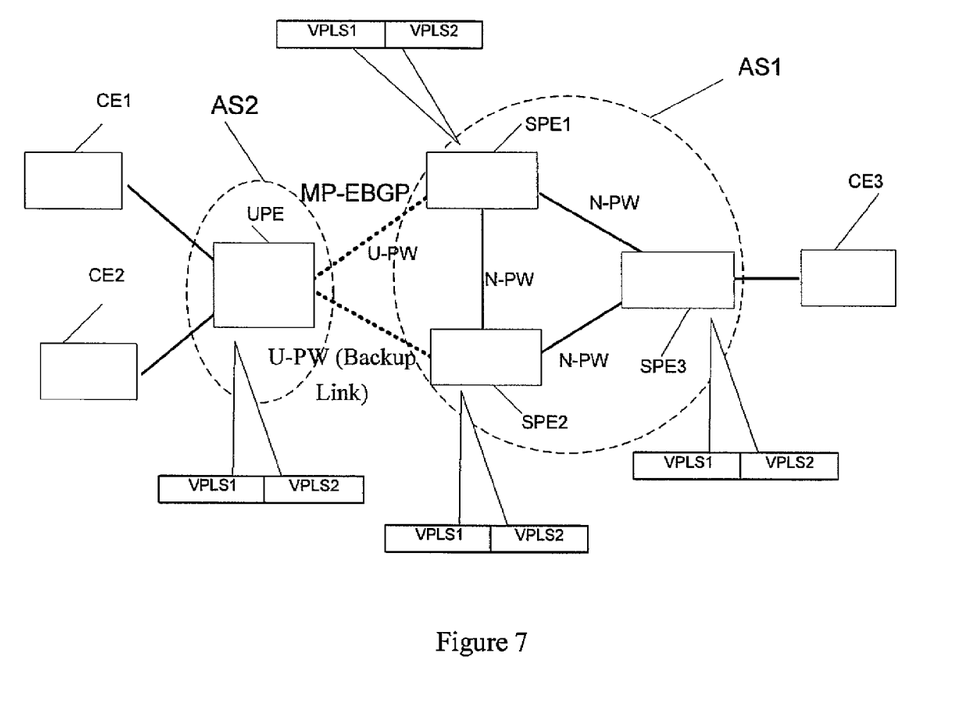
FIG. 7 is a schematic diagram showing the networking when no VPLS network hierarchies between the UPE and the SPE are consistent.

When no VPLS network hierarchies between the UPE and the SPE are consistent, for example, as shown in FIG. 7, the UPE lies in autonomous system AS2, while SPE1, SPE2 and SPE3 lie in autonomous system AS1.

There are two VPLS with different hierarchies in the UPE, SPE1, SPE2 and SPE3: VPLS1 and VPLS2; while there is only one VPLS in SPE3: VPLS2. In VPLS1, each point on the UPE, SPE1 and SPE2 is in the same hierarchical plane, and no split-horizon control is needed between them. In VPLS2, SPE1, SPE2 and SPE3 form a VPLS of the first hierarchy, and the UPE belongs to a VPLS of the second hierarchy, i.e. VPLS2 forms an HVPLS. Thus, if a Split-Horizon Disable Flag is set in the BGP neighbors between the UPE and the SPE, then VPLS2 can be satisfied, but VPLS1 cannot be satisfied. To ensure that VPLS1 and VPLS2 both can operate normally and independently, the following solution may be employed.

Figure 8:
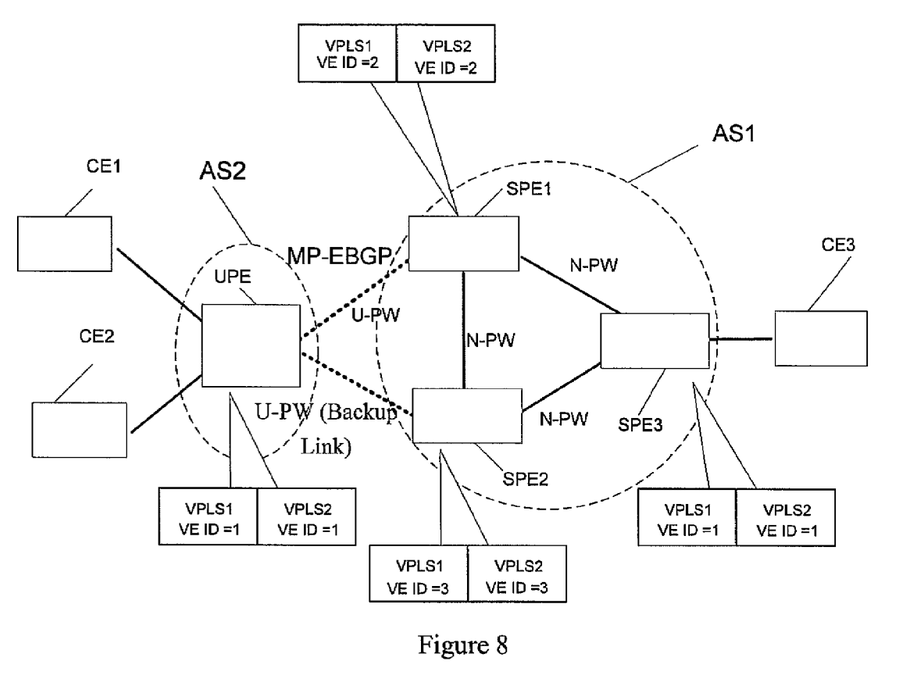
FIG. 8 is a schematic diagram showing the process in which the corresponding VEID is set in the BGP VPLS member management module of each VPLS network during network planning.

During network planning, the corresponding VEID is set in the BGP VPLS member management module of each VPLS network, as shown in FIG. 8.

In VPLS1, the VEID of UPE is set as 1, the VEID of SPE1 is set as 2, and the VEID of SPE2 is set as 3.

After the VEIDs of the UPE and the SPE in VPLS1 are set, no Split-Horizon Disable will be set mutually among point UPE with a VEID of 1, point SPE1 with a VEID of 2 and point SPE2 with a VEID of 3. Therefore, the packet delivery among UPE, SPE1 and SPE2 will not form a loop.

In VPLS2, the VEID of UPE is set as 1, the VEID of SPE1 is set as 2, and the VEID of SPE2 is set as 3.

After the VEIDs of the UPE and the SPE in VPLS2 are set, Split-Horizon Disable directed to SPE1 with a VEID of 2 and SPE2 with a VEID of 3 are configured at Point UPE with an VEID of 1, a Split-Horizon Disable to the point with a VEID of 1 is set at the point with a VEID of 2, and a Split-Horizon Disable to the point with a VEID of 1 is set at the point with a VEID of 3, but no Split-Horizon Disable is set between the point with a VEID of 2 and the point with a VEID of 3, i.e. no Split-Horizon Disable is set mutually between SPE1 and SPE2. At this point, the process in which SPE1 and SPE2 forward a packet is the same as the above process in which the SPE forwards a packet as shown in FIG. 6.

BGP VPLS network hierarchy can be realized by setting the VEID as Split-Horizon Disable in the BGP VPLS member management module as described above, i.e. HVPLS based on BGP can be realized.

Figure 9:
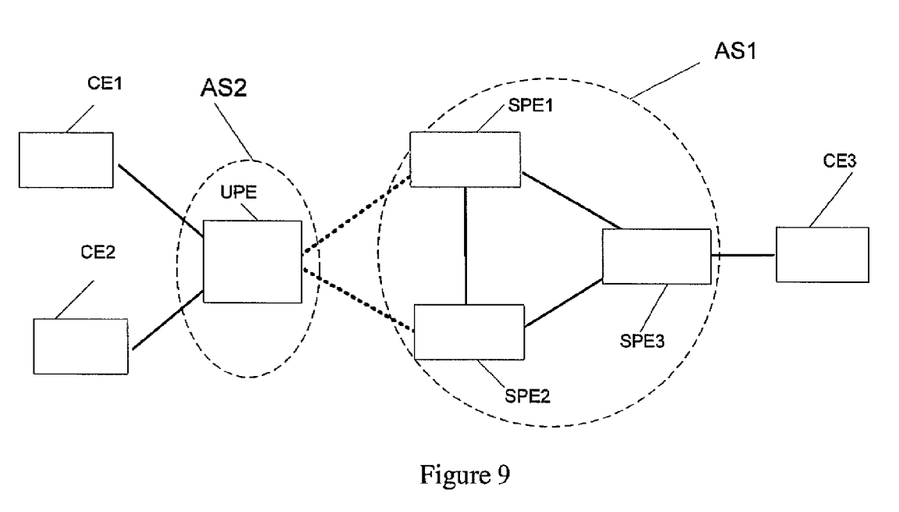
FIG. 9 is a functional block diagram of the first embodiment of the system according to the invention.

Referring to FIG. 9, it is a functional block diagram of the first embodiment of the system according to the invention.

In this embodiment, the UPE lies in autonomous system AS2, and SPE1, SPE2 and SPE3 lie in autonomous system AS1. The UPE is connected with SPE1 and SPE2 via BGP; in other words, a PW between the UPE and SPE1, and a backup PW between the UPE and SPE2, are established via BGP. Moreover, SPE1, SPE2 and SPE3 are also connected via BGP; in other words, the PWs among the SPEs are established via BGP.

In such a connection mode, the process to realize hierarchical VPLS is the same as described in the above method of the invention, so it is not described again here.

Figure 10:
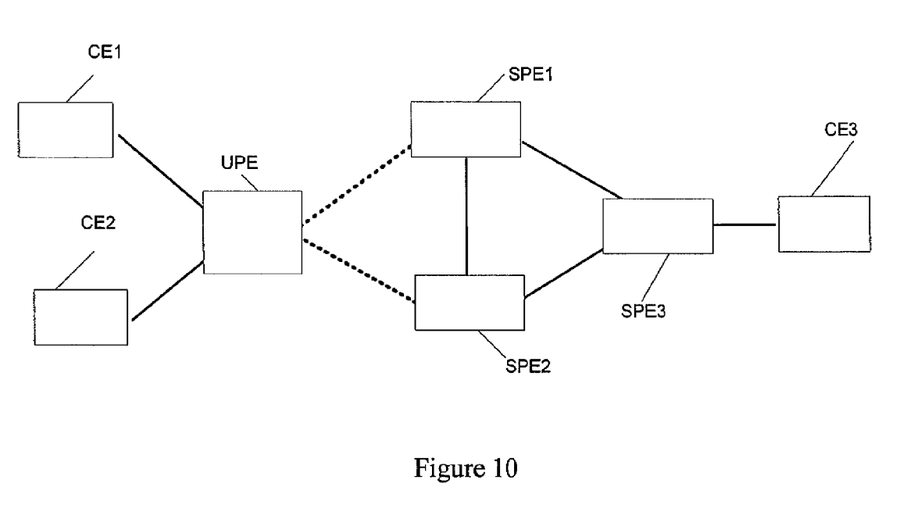
FIG. 10 is a functional block diagram of the second embodiment of the system according to the invention.

Referring to FIG. 10, it is a functional block diagram of the second embodiment of the system according to the invention.

In this embodiment, the UPE lies in the same autonomous system as SPE1, SPE2 and SPE3.

The UPE is connected with SPE1 and SPE2 via LDP and IGP respectively; in other words, a PW between the UPE and SPE1, and a backup PW between the UPE and SPE2, are established via LDP and IGP. SPE1, SPE2 and SPE3 are connected via BGP, i.e. PWs among the SPEs are established via BGP.

In such a connection mode, the process to realize hierarchical VPLS is the same as described in the above method of the invention, so it will not be described again here.

It can be seen from the technical solution provided by the invention that in the invention, with BGP signaling, hierarchical VPLS networks based on BGP across different autonomous systems or in same autonomous system are realized; for specific VPLS networks, hierarchical VPLS networks are realized by setting Virtual Equipment Identifier (VEID) as Split-Horizon Disable in a BGP VPLS member management module. Therefore, value-added services can be provided to carriers, utilization scheme of VPLS networks can be optimized and core competitiveness of the VPLS networks can be improved.

Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

The invention claimed is:

1. A method for implementing a hierarchical Virtual Private LAN Service, comprising:
   using a Border Gateway Protocol in a Virtual Private LAN Service network; and
   implementing the hierarchical Virtual Private LAN Service in the Virtual Private LAN Service network using the Border Gateway Protocol,
   wherein:
      when a User-end Provider Edge router and a Service Provider-end Provider Edge router in the Virtual Private LAN Service network belong to different autonomous systems, a Border Gateway Protocol connection is used between the User-end Provider Edge router and the Service Provider-end Provider Edge router, and among the Service Provider-end Provider Edge routers; and
      implementing the hierarchical Virtual Private LAN Service in the Virtual Private LAN Service network using the Border Gateway Protocol comprises:
         setting a Split-Horizon Disable Flag in a Border Gateway Protocol neighbor in a Border Gateway Protocol Virtual Private LAN Service address family, when all the Virtual Private LAN Service network hierarchies between the User-end Provider Edge router and the Service Provider-end Provider Edge router are consistent; and
         implementing the hierarchical Virtual Private LAN Service in the Virtual Private LAN Service network according to the Split-Horizon Disable Flag.

2. The method for implementing the hierarchical Virtual Private LAN Service according to claim 1, wherein:
   a Multi-Protocol External Border Gateway Protocol model is used to establish Pseudo Wires between the User-end Provider Edge router and the Service Provider-end Provider Edge router.

3. The method for implementing the hierarchical Virtual Private LAN Service according to claim 1, wherein:
   when the User-end Provider Edge router and the Service Provider-end Provider Edge router in the Virtual Private LAN Service network belong to the same autonomous system, a Border Gateway Protocol connection is used among the Service Provider-end Provider Edge routers, and a Label Distribution Protocol connection and an Interior Gateway Protocol connection are used between the User-end Provider Edge router and the Service Provider-end Provider Edge router.

4. The method for implementing the hierarchical Virtual Private LAN Service according to claim 3, wherein the method further comprises:
   pre-configuring a Border Gateway Protocol Virtual Private LAN Service member management module of the Service Provider-end Provider Edge router to be able to access a Label Distribution Protocol Virtual Private LAN Service.

5. The method for implementing the hierarchical Virtual Private LAN Service according to claim 4, wherein the method further comprises:
   establishing a Pseudo Wire between the User-end Provider Edge router and the Service Provider-end Provider Edge router using a Label Distribution Protocol and an Interior Gateway Protocol.

6. The method for implementing the hierarchical Virtual Private LAN Service according to claim 3, wherein the process of implementing the hierarchical Virtual Private LAN Service in the Virtual Private LAN Service network using the Border Gateway Protocol comprises:
   setting a Split-Horizon Disable Flag in a Border Gateway Protocol neighbor in a Border Gateway Protocol Virtual Private LAN Service address family, when all the Virtual Private LAN Service network hierarchies between the User-end Provider Edge router and the Service Provider-end Provider Edge router are consistent; and
   implementing the hierarchical Virtual Private LAN Service in the Virtual Private LAN Service network according to the Split-Horizon Disable Flag.

7. The method for implementing the hierarchical Virtual Private LAN Service according to claim 6, wherein the process of setting the Split-Horizon Disable Flag in the Border Gateway Protocol neighbor in the Border Gateway Protocol Virtual Private LAN Service address family comprises:
   configuring the Border Gateway Protocol neighbor manually in the User-end Provider Edge router and the Service Provider-end Provider Edge router of the Virtual Private LAN Service network; and
   sending a packet between the User-end Provider Edge router and the Service Provider-end Provider Edge router, and setting, by the User-end Provider Edge router and the Service Provider-end Provider Edge router that receive the packet, the Split-Horizon Disable Flag directed to a sending party in their Border Gateway Protocol neighbors.

8. The method for implementing the hierarchical Virtual Private LAN Service according to claim 6, wherein the process of implementing the hierarchical Virtual Private LAN Service in the Virtual Private LAN Service network according to the Split-Horizon Disable Flag comprises:
   delivering, by the User-end Provider Edge router or the Service Provider-end Provider Edge router that receives the packet, the Split-Horizon Disable Flag to their Virtual Switch Instance management module, and then refreshing, by the Virtual Switch Instance management module, flag information downward to a forwarding entry of the User-end Provider Edge router or the Service Provider-end Provider Edge router; and
   processing, by the forwarding entry of the User-end Provider Edge router or the Service Provider-end Provider Edge router, the forwarded packet according to the flag information received.

9. The method for implementing the hierarchical Virtual Private LAN Service according to claim 3, wherein the process of implementing hierarchical Virtual Private LAN Service in the Virtual Private LAN Service network using the Border Gateway Protocol comprises:

setting a Virtual Equipment Identifier in the Border Gateway Protocol Virtual Private LAN Service member management module when no Virtual Private LAN Service network hierarchies between the User-end Provider Edge router and the Service Provider-end Provider Edge router are consistent; and implementing the hierarchical Virtual Private LAN Service in the Virtual Private LAN Service network based on the Virtual Equipment Identifier.

10. The method for implementing the hierarchical Virtual Private LAN Service according to claim 9, wherein the process of setting the Virtual Equipment Identifier in the Border Gateway Protocol Virtual Private LAN Service member management module comprises:

setting the Virtual Equipment Identifier in the Virtual Private LAN Service member management module of the Virtual Private LAN Service network between the User-end Provider Edge router and the Service Provider-end Provider Edge router; and configuring the Split-Horizon Disable directed to the Virtual Equipment Identifiers of other members mutually in the Virtual Private LAN Service member management modules of the Virtual Private LAN Service network at different hierarchies between the User-end Provider Edge router and the Service Provider-end Provider Edge router.

11. The method for implementing the hierarchical Virtual Private LAN Service according to claim 1, wherein the process of setting the Split-Horizon Disable Flag in the Border Gateway Protocol neighbor in the Border Gateway Protocol Virtual Private LAN Service address family comprises:

configuring the Border Gateway Protocol neighbor manually in the User-end Provider Edge router and the Service Provider-end Provider Edge router of the Virtual Private LAN Service network; and sending a packet between the User-end Provider Edge router and the Service Provider-end Provider Edge router, and setting, by the User-end Provider Edge router and the Service Provider-end Provider Edge router that receive the packet, the Split-Horizon Disable Flag directed to a sending party in their Border Gateway Protocol neighbors.

12. The method for implementing the hierarchical Virtual Private LAN Service according to claim 1, wherein the process of implementing the hierarchical Virtual Private LAN Service in the Virtual Private LAN Service network according to the Split-Horizon Disable Flag comprises:

delivering, by the User-end Provider Edge router or the Service Provider-end Provider Edge router that receives the packet, the Split-Horizon Disable Flag to their Virtual Switch Instance management module, and then refreshing, by the Virtual Switch Instance management module, flag information downward to a forwarding entry of the User-end Provider Edge router or the Service Provider-end Provider Edge router; and processing, by the forwarding entry of the User-end Provider Edge router or the Service Provider-end Provider Edge router, the forwarded packet according to the flag information received.

13. The method for implementing the hierarchical Virtual Private LAN Service according to claim 1, wherein the process of implementing hierarchical Virtual Private LAN Service in the Virtual Private LAN Service network using the Border Gateway Protocol comprises:

setting a Virtual Equipment Identifier in the Border Gateway Protocol Virtual Private LAN Service member management module when no Virtual Private LAN Service network hierarchies between the User-end Provider Edge router and the Service Provider-end Provider Edge router are consistent; and implementing the hierarchical Virtual Private LAN Service in the Virtual Private LAN Service network based on the Virtual Equipment Identifier.

14. The method for implementing the hierarchical Virtual Private LAN Service according to claim 13, wherein the process of setting the Virtual Equipment Identifier in the Border Gateway Protocol Virtual Private LAN Service member management module comprises:

setting the Virtual Equipment Identifier in the Virtual Private LAN Service member management module of the Virtual Private LAN Service network between the User-end Provider Edge router and the Service Provider-end Provider Edge router; and configuring the Split-Horizon Disable directed to the Virtual Equipment Identifiers of other members mutually in the Virtual Private LAN Service member management modules of the Virtual Private LAN Service network at different hierarchies between the User-end Provider Edge router and the Service Provider-end Provider Edge router.

15. A system for implementing a hierarchical Virtual Private LAN Service, comprising at least one User-end Provider Edge router and at least one Service Provider-end Provider Edge router, wherein:

the User-end Provider Edge router and the Service Provider-end Provider Edge router are connected via a Border Gateway Protocol;

when the User-end Provider Edge router and the Service Provider-end Provider Edge router belong to different autonomous systems respectively, the User-end Provider Edge router and the Service Provider-end Provider Edge router are connected via a Border Gateway Protocol, and the Service Provider-end Provider Edge routers are connected via the Border Gateway Protocol with each other;

the Service Provider-end Provider Edge router is configured to:

set a Split-Horizon Disable Flag in a Border Gateway Protocol neighbor in a Border Gateway Protocol Virtual Private LAN Service address family, when all the Virtual Private LAN Service network hierarchies between the User-end Provider Edge router and the Service Provider-end Provider Edge router are consistent; and implement the hierarchical Virtual Private LAN Service in the Virtual Private LAN Service network according to the Split-Horizon Disable Flag.

16. The system for implementing the hierarchical Virtual Private LAN Service according to claim 15, wherein:

when the User-end Provider Edge router and the Service Provider-end Provider Edge router belong to the same autonomous system, the User-end Provider Edge router and the Service Provider-end Provider Edge router are connected via a Label Distribution Protocol and an Interior Gateway Protocol, and the Service Provider-end Provider Edge routers are connected via the Border Gateway Protocol.

* * * * *